United States Patent

[11] 3,626,056

[72] Inventors  Alphonse Peter Granatek
               Baldwinsville;
               Bernard Charles Nunning, Liverpool;
               Nicholas George Athanas, East Syracuse;
               Robert Lewis Dana, Liverpool; Edmund
               Stanley Granatek, Baldwinsville; Raymond
               George Daoust, De Witt, all of N.Y.
[21] Appl. No.  680,008
[22] Filed      Nov. 2, 1967
[45] Patented   Dec. 7, 1971
[73] Assignee   Bristol-Myers Company

[54] ORAL ANTIBIOTIC PRODUCT
     25 Claims, No Drawings

[52] U.S. Cl. .................................................. 424/35,
                                      424/38, 424/155, 424/271
[51] Int. Cl. ........................................................ A61k 27/00
[50] Field of Search ........................................ 424/35, 38,
                                                          155, 271

[56]             References Cited
                 UNITED STATES PATENTS
2,487,336  11/1949  Hinds ............................  424/38
2,805,977   9/1957  Robinson et al. ...............  424/35
2,902,407   9/1959  Gross et al. ....................  424/271
2,921,883   1/1960  Reese et al. ....................  424/35
2,980,589   4/1961  De Grunigen ..................  424/271
3,214,337  10/1965  Couturier .......................  424/35
3,247,065   4/1966  Koff ................................  424/35
3,317,389   5/1967  Granatek et al. ..............  424/271
3,337,402   8/1967  Zentner ..........................  424/155

*Primary Examiner*—Stanley J. Friedman
*Attorneys*—Curtis W. Carlson, Richard H. Brink and Herbert W. Taylor, Jr.

ABSTRACT: An aqueous penicillin suspension comprising coated particles of certain penicillins such as dicloxacillin, the coating comprising ethylcellulose and a pharmaceutically acceptable wax, an aqueous pharmaceutical vehicle and kaolin or colloidal magnesium aluminum silicate when administered orally to animals including man is useful in the treatment of bacterial infections.

ORAL ANTIBIOTIC PRODUCT

BACKGROUND OF THE INVENTION

1. Field of the Invention

This invention relates to novel antibacterial compositions for oral administration. More particularly this invention relates to a novel pleasant tasting penicillin suspension which is useful for treating bacterial infections in animals including man.

2. Description of the Prior Art

Penicillins have been used with considerable success in the treatment of bacterial infections in man. Unfortunately some of the penicillins and in particular the isoxazolyl series of penicillins e.g. oxacillin, cloxacillin, dicloxacillin and flucloxacillin as well as nafcillin and to some extent ampicillin and hetacillin have an extremely bitter taste. The taste has been difficult to mask by the mere addition of flavoring or sweetening agents to oral suspensions. This problem has been substantially eliminated by coating the penicillins with the coating materials described herein and using the coated penicillins in such suspensions. The coated penicillins and the process for the preparation thereof do not constitute a part of the invention described herein.

Another problem however arises when one incorporates any of these coated penicillins in conventional pharmaceutical vehicles used for oral administration of penicillins if the density of the coated penicillin particles is less than the density of the vehicle. The coated penicillin particles tend to float on top of the pharmaceutical vehicle. Thus it is an object of the present invention to provide a uniform palatable penicillin suspension for oral administration in the treatment of bacterial infections in man. Another object of the present invention is to essentially eliminate the slight taste imparted to oral suspensions utilizing coated penicillin particles caused by the pharmaceutical vehicle leaching the penicillin from the coated particles.

SUMMARY OF THE INVENTION

The composition of the present invention is an aqueous penicillin suspension for oral administration comprising an aqueous pharmaceutical vehicle, coated particles of a penicillin selected from the group consisting of ampicillin, hetacillin, nafcillin, oxacillin, cloxacillin, dicloxacillin and flucloxacillin and mixtures thereof, wherein said coated particles have a maximum particle size of about 40 mesh and a density of less than the density of the pharmaceutical vehicle; and an effective amount of a member selected from the group consisting of kaolin and colloidal magnesium aluminum silicate and mixtures thereof to inhibit flotation of the coated penicillin particles in the pharmaceutical vehicle.

DETAILED DESCRIPTION

The compositions of this invention are uniform suspensions of coated penicillin particles suitable for oral administration to humans. The penicillin contained in the compositions is absorbed from the human gastrointestinal tract upon oral administration substantially at the same rate as from like suspensions containing uncoated penicillin. Additionally the compositions are pleasant tasting with respect to the bitter taste of the penicillins incorporated in the compositions.

The term "aqueous pharmaceutical vehicle" as used herein includes water alone or water containing certain other materials commonly added to increase the elegance of products designed for oral administration, e.g. sweetening agents such as sodium saccharin, sucrose or sorbitol, dyes, flavors and preservatives such as methyl paraben, propyl paraben and sodium benzoate.

As used herein the terms oxacillin (3-phenyl-5-methyl-4-isoxazolylpenicillin), cloxacillin [3-(3-chlorophenyl-5-methyl-4-isoxazolylpenicillin], dicloxacillin [3-(2,6-dichlorophenyl)-5-methyl-4-isoxazolylpenicillin], and flucloxacillin [3-(2-chloro-6-fluorophenyl)-5-methyl-4-isoxazolylpenicillin] include the free acid forms and the nontoxic, pharmaceutically acceptable cationic salts of those penicillins and the anhydrates and hydrates of those penicillins. The preparation and properties thereof have been described, inter alia, in U.S. Pat. Nos. 2,996,501, 3,239,507 and 3,317,389.

As used herein the term nafcillin (2-ethoxy-1-naphthylpenicillin) includes the free acid form and the nontoxic, pharmaceutically acceptable cationic salts of the penicillin and the anhydrates and hydrates of that penicillin. The preparation and properties thereof have been described, inter alia, in U.S. Pat. No. 3,157,639.

Ampicillin is the generic name for D-(-)-α-amino-benzylpenicillin. As used herein, the term ampicillin includes the free acid, (i.e. amphoteric) form, the anionic salts with acids such as hydrochloric acid, and cationic salts with bases such as sodium hydroxide and the anhydrates and hydrates of that penicillin. Their preparation and properties have been described, inter alia, in U.S. Pat. No. 2,985,648, 3,140,282, 3,144,445 and 3,157,640 and in an application of our colleagues Herbert H. Silvestri and David A. Johnson filed Oct. 29, 1962, as U.S. Ser. No. 233,943 and issued Apr. 27, 1965, as U.S. Pat. No. 3,180,862.

Hetacillin is the generic name for 6-(2,2-dimethyl-5-oxo-4-phenyl-1-imidazolidinyl)penicillanic acid which has the structure

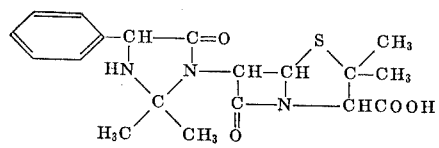

As used herein, the term hetacillin includes the "free acid" illustrated above and its nontoxic, pharmaceutically acceptable cationic salts of the acidic carboxylic acid group and its nontoxic, pharmaceutically acceptable acid addition anionic salts, (i.e. salts of the basic nitrogen) and the anhydrates and hydrates of that penicillin. Their preparation and properties are described in Belgian Pat. No. 642,851 and in an application of our colleagues David A. Johnson and Charles A. Panetta filed Jan. 6, 1965, as U.S. Ser. No. 423,677 and issued Aug. 3, 1965, as U.S. Pat. No. 3,198,804.

Colloidal magnesium aluminum silicate as used herein refers to an inorganic, complex, colloidal magnesium aluminum silicate. The product is marketed under the trademark Veegum by Vanderbilt Company Inc. Veegum has the following average chemical analysis expressed as oxides:

| | |
|---|---|
| Silicon Dioxide | 61.1% |
| Magnesium Oxide | 13.7% |
| Aluminum Oxide | 9.3% |
| Titanium Dioxide | 0.1% |
| Ferric Oxide | 0.9% |
| Calcium Oxide | 2.7% |
| Sodium Oxide | 2.9% |
| Potassium Oxide | 0.3% |
| Carbon Dioxide | 1.8% |
| Water of Combination | 7.2% |

The waxes useful in the coatings with ethylcellulose are the water insoluble pharmaceutically acceptable waxes including paraffin wax, ozokerite wax, ceresin wax, Utah wax, montan wax, carnauba wax, Japan wax, bayberry wax, flax wax, candelilla wax, sugar cane wax, spermaceti wax, beeswax, Chinese wax, shellac wax, Castorwax (hydrogenated castor oil), and the like. A single wax or mixture of waxes can be used. A preferred wax is spermaceti wax and a preferred mixture of waxes is spemaceti wax and Castorwax.

The penicillins used in the compositions of this invention are conveniently coated by a process which comprises suspending micronized particles of the penicillin in a solution of the coating material in a nonreactive volatile organic solvent, spray drying the suspension and recovering the coated penicillin particles. However any of the conventional coating methods can be used.

In carrying out the process, a suspension of micronized particles of the penicillin in a solution containing ethylcellulose and a pharmaceutically acceptable wax in a nonreactive volatile organic solvent or mixture or solvents is spray dried by spraying the suspension into a heated nonreactive gaseous medium to remove the solvent. The suspension contacts the gaseous medium as finely divided droplets. The term micronized as used herein means a particle size not greater than 30 microns.

The suspension of sodium dicloxacillin is sprayed into a heated nonreactive gaseous medium, e.g. air, having a temperature of about 240° to 260° F. preferably about 250° F. to rapidly vaporize the solvent. The vaporized solvent is removed by the gaseous medium.

The solvent used to dissolve the coating material is vaporized and removed during spray drying. Thus the solvent must be volatile. Representative of useful solvents include methylene chloride, chloroform, cyclohexane, carbon tetrachloride, methylethylketone, acetone, and the like. The preferred solvent is methylene chloride.

The coated penicillin particles contain from about 7 parts by weight of coating material per part by weight of penicillin to about 9 parts by weight of penicillin per part by weight of coating material. The coated penicillin particles preferably contain about 1 to 3 parts by weight of coating material per part by weight of penicillin and in the most preferred embodiment 3 parts by weight of coating material per part by weight of penicillin. The coating preferably contains about 1 to 3 parts by weight of wax or mixture of waxes per part by weight of ethylcellulose.

While the coating of the penicillins must contain ethylcellulose and a pharmaceutically acceptable wax to achieve its desired properties, other coating materials can also be included e.g. hydrogenated peanut oil, cetyl alcohol, hydrogenated vegetable oil and the like.

The following combinations of coating materials are particularly useful: ethylcellulose—spemaceti wax, ethylcellulose—Castorwax—spermaceti wax, ethylcellulose—beeswax—Castorwax—cetyl alcohol, Castorwax—hydrogenated peanut oil, ethylcellulose—paraffin wax, and ethylcellulose—spermaceti wax—Castorwax—paraffin wax.

The coated penicillin particles for used in the compositions of this invention have a size not larger than 40 mesh (U.S.) and particles having a size of not larger than 150 mesh (.U.S.) are preferred.

In a preferred embodiment of the present invention, dicloxacillin coated with ethylcellulose and spermaceti wax is employed in the composition. In the preparation of the coated dicloxacillin, a suspension comprising dicloxacillin ethylcellulose, spermaceti wax and methylene chloride is sprayed into air at about 250° F. Ethylcellulose and spermaceti wax are present in the suspension in the proportion of 1 part by weight per part by weight of sodium dicloxacillin and 2 parts by weight per part by weight of sodium dicloxacillin respectively. The solvent, methylene chloride, is present in the proportion of from about 7 ½ to 15 liters per kilogram of sodium dicloxacillin, ethylcellulose and spermaceti wax. The suspension flow rate is adjusted to obtain proper evaporation of the methylene chloride.

In a preferred embodiment of this invention, the aqueous pharmaceutical vehicle comprises water, gum tragacanth, sodium chloride and sucrose. In a more preferred embodiment the aqueous pharmaceutical vehicle comprises from about 0.25 to 0.75 g. gum tragacanth, 0.5 to 2.4 g. sodium chloride, and 5 to 33 g. sucrose per 60 ml. of suspension and sufficient water to fill.

When the preferred aqueous pharmaceutical vehicle is used in the compositions of this invention not only is the flotation problem eliminated by any penicillin taste caused by leaching of the penicillin from the coated penicillin particles is also masked.

In a preferred embodiment of the present invention the composition contains from about 50 to about 125 mg. of penicillin activity per 5 ml. of suspension. In a more preferred embodiment the composition contains from about 60 to about 70 mg. of penicillin activity per 5 ml. of suspension.

In a typical procedure for preparing the compositions of this invention, kaolin or colloidal magnesium aluminum silicate or a mixture thereof is added to a suspension of coated penicillin particles in an aqueous pharmaceutical vehicle. Kaolin or colloidal magnesium aluminum silicate is added to the suspension with mixing until the coated penicillin particles are dispersed throughout the vehicle and remain dispersed after mixing is stopped. The quantity of kaolin or colloidal magnesium aluminum silicate required varies with the particle size, density, and amount of the coated penicillin particles and with the density of the vehicle. For a suspension having about 50–125 mg. of penicillin activity per 5 ml. of suspension, from about 1 to about 3 parts kaolin or from about 2 to about 5 parts colloidal magnesium aluminum silicate per part of coated penicillin has been found to be useful. Usually from about 3 to 7 g. of kaolin or 6 to 8 g. of colloidal magnesium aluminum silicate is employed per 60 ml. of suspension. However, the exact amount required is easily determined as described above.

Typically water is omitted from the compositions of this invention until shortly before actual use by the patient. Such dry compositions have the advantage of long stability. Upon reconstitution with water such formulations can be stored for several days without appreciable loss of potency.

The oral suspensions of this invention are especially useful for pediatric use - i.e., for the administration of the specified antibacterial agents, e.g. dicloxacillin to young children who are unable or refuse to swallow tablets. The suspensions of this invention offer all of the established therapeutic benefits of other oral preparations of the specified penicillins, e.g. dicloxacillin. Thus, they may be used for the control of infections sensitive to the specified penicillins, e.g. dicloxacillin sensitive organisms causing respiratory tract infections. The ampicillin and hetacillin suspensions of this invention are effective against Gram-positive as well as many Gram-negative organisms; and the oxacillin, dicloxacillin, flucloxacillin and cloxacillin and nafcillin suspensions are particularly effective against Gram-positive bacteria, including especially those resistant to benzylpenicillin. The suspensions are administered in the same dosages as other oral preparations containing the same penicillins, e.g. dicloxacillin. Thus, for children the suspension may be administered to provide daily about 50 mg. ampicillin or cloxacillin or oxacillin, or 25 mg. of hetacillin or nafcillin, or 12.5 mg. of flucloxacillin or dicloxacillin per kg. of body weight per day given in three or four divided doses. For adults the suspension may be administered to provide daily about 1 g. of ampicillin or cloxacillin or hetacillin or nafcillin or 2 g. of oxacillin or 500 mg. of dicloxacillin or flucloxacillin given in three or four divided doses. In particularly severe infections the foregoing dosages are doubled.

The following examples are intended to illustrate the invention claimed herein without unduly restricting it.

EXAMPLE 1

Spray coated ethylcellulose-spermaceti-sodium dicloxacillin formula

| | Amounts for 1,000 grams |
|---|---|
| Sodium dicloxacillin, micronized, grams | 250.0 |
| Ethylcellulose (viscosity 100 cps.), grams | 250.0 |
| Spermaceti wax, grams | 500.0 |
| Methylene chloride, liters | 15.0 |

Manufacturing Instructions

1. Dissolve the spermaceti wax in approximately 8 liters of Methylene Chloride. The operation is carried out in a 20-liter glass or stainless steel container with the aid of a mixer (e.g. a Lightnin mixer). No heat is required.

2. To the clear solution obtained in step No. 1, add the Ethylcellulose in small portions while maintaining agitation. Stir until a clear and relatively viscous solution is obtained.

3. The Sodium Dicloxacillin is then added in small portions while maintaining agitation. A milky white suspension will result.

4. Strain the solution obtained in step No. 3 through three layers of cheesecloth if necessary to remove any particulate contaminants.

5. The remainder of the Methylene Chloride (7 liters) is then added while agitation is maintained and complete dispersion of the Sodium Dicloxacillin is effected. The dispersion must be free from small lumps or agglomerates.

6. The Nerco-Niro Laboratory Model Spray Drier is readied as follows for the following conditions:

NOTE: Assemble completely before starting except for the atomizer.

a. Turn on the electric heater to setting No. 2 or 3 until the inlet air gauge reads around 130° C.

b. When equilibrium is reached: The inlet air gauge will read—115°–120° C. The outlet air gauge will read—50°–55° C.

c. Install the turbine atomizer in its proper position over a teflon gasket and feed compressed air until the atomizer gauge reads 6 kg./cm.² At this point maximum compressed air pressure is in use (90–100 lbs.) and the turbine is turning at a rate of 40,000 r.p.m. Allow 5 minutes for equilibrium in the chamber before liquid feeding is commenced.

d. Start liquid feed to the turbine from a 2-liter separatory funnel connected to the turbine by a short piece of teflon tubing. Feed at a rate of 60 ml. to 80 ml. per minute e. Monitor the operation to maintain the following drying conditions throughout the entire operation:
Inlet Air: 115°–120° C.
Outlet Air: 60°–70° C.

f. Stop the atomizer and turn the electric heater to position M (exhaust fan). Allow 5 minutes in this position before lifting cover.

g. Lift cover with the aid of the hydraulic lift and collect product from the walls.

h. The product is not expected to stick to the walls of the chamber other than by electrostatic forces.

i. Dry product in vacuum oven overnight at room temperature. The Methylene Chloride residue is less than 0.5 percent.

j. The free flowing coated Sodium Dicloxacillin product is passed through a 40 mesh screen and collected.

EXAMPLE 2

Spray coated sodium dicloxacillin for oral suspension, 62.5 mg./5 ml. (ethylcellulose-spermaceti coating)

Formula: Per 60 ml.
Sodium dicloxacillin (spray coated ethylcellulose-spermaceti from Example 1), gram _____ *0.825
Sodium cyclamate, grams _____ 2.400
Sodium saccharin, gram _____ 0.400
Sodium citrate, anhydrous gram _____ 0.420
Sodium benzoate, gram _____ 0.060
Sodium chloride, grams _____ 1.200
Gum tragacanth, gram _____ 0.425
Kaolin, grams _____ 6.000
Sucrose, 30 mesh, grams _____ 25.000
Dye, gram _____ 0.500
Flavors, gram _____ 0.930

* Dicloxacillin activity, 3.7 g. This figure represents dicloxacillin activity and includes 10% excess. To calculate the amount of sodium dicloxacillin to be used, apply the following formula:

$$\frac{0.825 \times 1{,}000}{\text{Potency of coated sodium dicloxacillin in mcg./mg.}} = \text{Grams coated sodium dicloxacillin to use per bottle}$$

Manufacturing Instructions

1. Mix all of the ingredients except the spray coated Sodium Dicloxacillin and the Kaolin with approximately one-third of the Sucrose in a suitable blender. Mix for 30 minutes.

2. Add the blend from Step No. 1 to the remainder of the Sucrose and add the Kaolin. Mix for 30 minutes.

4. Fill into 3 oz. round flint bottles.

Reconstitution: Add a sufficient volume of distilled water to make 60.0 ml. This will yield a suspension having 10 percent over the label claim potency of 62.5 mg. per 5 ml. of Sodium Dicloxacillin activity.

EXAMPLE 3

Spray coated ethylcellulose-spermaceti-castorwax-sodium dicloxacillin formula

| | Amount per 1,000 grams |
|---|---|
| Sodium dicloxacillin, micronized___grams__ | 250.0 |
| Ethylcellulose (viscosity 100 cps.)__grams__ | 250.0 |
| Spermaceti wax _____grams__ | 416.5 |
| Castorwax (melting point 85° C.)__grams__ | 83.5 |
| Methylene chloride _____liters__ | 7.575 |

NOTE.—The preparation must be kept at a temperature of 20° to 25° C. to prevent the waxes from precipitating out of solution.

Manufacturing Instructions

1. In a suitable stainless steel container and with the aid of a mixer, (e.g. a Lightnin mixer) dissolve the Spermaceti and the Castorwax with Methylene Chloride. If necessary use steam as a heat source in order to maintain a temperature of about 25° C. and facilitate dissolution of the Castorwax.

2. To the clear solution obtained in step No. 1, add the Ethylcellulose in small portions while maintaining agitation until a clear viscous solution is obtained.

3. To the solution in step No. 2 add the sodium Dicloxacillin in small portions while maintaining agitation. Continue mixing until a milky white suspension is obtained. It must be free from lumps or small aggregates.

4. Pass the solution obtained in step No. 3 through three layers of cheesecloth if necessary in order to remove particulate contaminants.

5. Transfer the dispersion from step No. 4 into the Graco Pump and Spray Gun Assembly (Monarch Model). Connect the pump to the 100 lbs. compressed air supply and circulate the dispersion for at least 5 minutes by manually adjusting the air pressure to 60 lbs.

6. Fit the Graco Spray Gun with Tip No. DLN–C1150 (0.011 inch).

7. Assemble the Nerco-Niro Laboratory Spray Drier completely with the exception of the air driven atomizing turbine and establish the following temperature equilibrium:
Inlet Air: 115°–120° C.
Outlet Air: 45°–50° C.

8. Remove the porthole from the side of the Spray Drier, insert the spray gun and activate the gun maintaining constant spraying.

9. Occasionally inspect the gun for clogging, remove and clean tip if necessary.

10. Collect the product and dry in the vacuum oven at room temperature overnight. The Methylene Chloride residue is less than 0.5 percent.

11. The free flowing coated Sodium Dicloxacillin product is passed through a 40 mesh screen and collected.

EXAMPLE 4

Spray coated sodium dicloxacillin powder for oral suspension, 62.5 mg./5 ml. (ethylcellulose- spermaceti-castorwax coating)

Formula: Per 60 ml.
Sodium dicloxacillin (spray coated ethylcellulose-spermaceti-castorwax from Example 3), gram _____ *0.825
Sodium cyclamate, gram _____ 2.400
Sodium saccharin, gram _____ 0.400
Sodium citrate, anhydrous, gram _____ 0.420
Sodium benzoate, gram _____ 0.060

EXAMPLE 4 – Continued

| | |
|---|---|
| Sodium chloride, grams | 1.200 |
| Gum tragacanth, gram | 0.425 |
| Kaolin N.F, gram | 6.000 |
| Sucrose, 30 mesh, grams | 25.000 |
| Dye, gram | 0.500 |
| Flavors, gram | 0.930 |

*Dicloxacillin activity, 3.7 g. This figure represents dicloxacillin activity and includes a 10% excess. To calculate the amount of sodium dicloxacillin to be used, apply the following formula:

$$\frac{0.825 \times 1000}{\text{Potency of coated sodium dicloxacillin in mcg./mg.}} = \text{Grams coated sodium dicloxacillin to use per bottle.}$$

Manufacturing Instructions

1. Mix all of the ingredients except the spray coated Sodium Dicloxacillin and the Kaolin with approximately one-third of the Sucrose in a suitable blender. Mix for 30 minutes.

2. Add the blend from step No. 1 to the remainder of the Sucrose and add the Kaolin. Mix for 30 minutes.

3. Add the spray coated Sodium Dicloxacillin to the blend in step No. 2 and mix for 30 minutes.

4. Fill into 3 oz. round flint bottles.

Reconstitution: Add a sufficient volume of distilled water to make 60.0 ml. This will yield a suspension having 10 percent over the label claim potency of 62.5 mg. per 5 ml. of Sodium Dicloxacillin activity.

EXAMPLE 5

Spray coated ethylcellulose-castorwax-beeswax-cetyl alcohol-sodium dicloxacillin formula

| | Amount per 1,000 grams |
|---|---|
| Sodium dicloxacillin, micronized, grams | 250.0 |
| Ethylcellulose (viscosity 100 cps.), grams | 250.0 |
| Castorwax (melting point 85° C.), grams | 100.0 |
| Beeswax, grams | 300.0 |
| Cetyl alcohol, grams | 100.0 |
| Methylene chloride, liters | 7.575 |

Note.—This preparation must be kept at a temperature of 20° C. to 25° C. to prevent the waxes from precipitating out of solution.

Manufacturing Instructions

1. In a suitable stainless steel container and with the aid of a mixer (e.g. a Lightnin mixer) dissolve the Castorwax, Beeswax, and Cetyl Alcohol with Methylene Chloride. If necessary use steam as a heat source in order to maintain a temperature of about 25° C. and facilitate dissolution of the Castorwax.

2. To the clear solution obtained in step No. 1, add the Ethylcellulose in small portions while maintaining agitation until a clear viscous solution is obtained.

3. To the solution in step No. 2 add the Sodium Dicloxacillin in small portions while maintaining agitation. Continue mixing until a milky white suspension is obtained. It must be free from lumps or small aggregates.

4. Pass the solution obtained in step No. 3 through three layers of cheesecloth if necessary in order to remove particulate contaminants.

5. Transfer the dispersion from step No. 4 into the Graco Pump and Spray Gun Assembly (Monarch Model). Connect the pump to the 100 lbs. compressed air supply and circulate the dispersion for at least 5 minutes by manually adjusting the air pressure to 60 lbs.

6. Fit the Graco Spray Gun with Tip No. DLN—C1150 (0.011 inch).

7. Assemble the Nerco-Niro Laboratory Spray Drier completely with the exception of the air driven atomizing turbine and establish the following temperature equilibrium:

Inlet Air: 115°–120° C.
Outlet Air: 45°–50° C.

8. Remove the porthole from the side of the Spray Drier, insert the spray gun and activate the gun maintaining constant spraying.

9. Occasionally inspect the gun for clogging, remove and clean tip if necessary.

10. Collect the product and dry in the vacuum oven at room temperature overnight. The Methylene Chloride residue is less than 0.5 percent.

11. The free flowing coated sodium dicloxacillin is passed through a 40 mesh screen and collected.

EXAMPLE 6

Spray coated sodium dicloxacillin for oral suspension 62.5 mg./5 ml. (ethylcellulose-beeswax-castorwax-cetyl alcohol coating

| Formula: | Per 60 ml. |
|---|---|
| Sodium dicloxacillin (spray coated ethylcellulose-beeswax-castorwax-cetyl alcohol from Example 5), grams | *0.825 |
| Sodium cyclamate, grams | 2.400 |
| Sodium saccharin, gram | 0.400 |
| Sodium citrate, anhydrous, gram | 0.420 |
| Sodium benzoate, gram | 0.060 |
| Sodium chloride, grams | 1.200 |
| Gum tragacanth, Soluble Products Corp., gram | 0.425 |
| Kaolin, grams | 6.000 |
| Sucrose, 30 mesh, grams | 25.000 |
| Dye, gram | 0.500 |
| Flavors, gram | 0.930 |

*Dicloxacillin activity, 3.7 g. This figure represents dicloxacillin activity and includes a 10% excess. To calculate the amount of sodium dicloxacillin to be used, apply the following formula:

$$\frac{0.825\times 1,000}{\text{Potency of coated sodium dicloxacillin in mcg./mg.}} = \text{Grams coated sodium dicloxacillin to use per bottle.}$$

Manufacturing Instructions

1. Mix all of the ingredients except the spray coated Sodium Dicloxacillin and the Kaolin with approximately one-third of the Sucrose in a suitable blender. Mix for 30 minutes.

2. Add the blend from step No. 1 to the remainder of the Sucrose and add the Kaolin. Mix for 30 minutes.

3. Add the spray coated Sodium Dicloxacillin to the blend in step No. 2 and mix for 30 minutes.

4. Fill into 3oz. round flint bottles.

Reconstitution: Add a sufficient volume of distilled water to make 60.0 ml. This will yield a suspension having 10 percent over the label claim potency of 62.5 mg. per 5 ml. of Sodium Dicloxacillin activity.

EXAMPLE 7

Spray coated ethylcellulose-castorwax-hydrogenated peanut oil flakes-aratex-sesame oil-sodium dicloxacillin Formula

| | Amount per 1,000 grams |
|---|---|
| Sodium dicloxacillin, micronized, grams | 250.0 |
| Ethylcellulose (viscosity 100 cps.), grams | 250.0 |
| Hydrogenated peanut oil flakes, grams | 163.0 |
| Hydrogenated vegetable oil with lecithin (aratex, Durkee Famous Foods), grams | 163.0 |
| Castorwax (melting point 85° C.), grams | 111.0 |
| Sesame oil, U.S.P., grams | 63.0 |
| Methylene chloride, liters | 7.575 |

NOTE.—This preparation must be kept at a temperature of 20° C. to 25° C. to prevent the waxes from precipitating out of solution.

Manufacturing Instructions

1. In a suitable stainless steel container and with the aid of a mixer, (e.g. a Lightnin mixer) dissolve the Castorwax, Hydrogenated Peanut Oil Flakes, Aratex and Sesame Oil with Methylene Chloride. If necessary use steam as a heat source in order to maintain a temperature of about 25° C. and facilitate dissolution of the Castorwax.

2. To the clear solution obtained in step No. 1, add the Ethylcellulose in small portions while maintaining agitation until a clear viscous solution is obtained.

3. To the solution in step No. 2 add the Sodium Dicloxacillin in small portions while maintaining agitation. Continue mixing until a milky white suspension is obtained. It must be free from lumps or small aggregates.

4. Pass the solution obtained in step No. 3 through three layers of cheesecloth, if necessary, to remove particulate contaminants.

5. Transfer the dispersion from step No. 4 into the Graco Pump and Spray Gun Assembly (Monarch Model). Connect the pump to the 100 lbs. compressed air supply and circulate the dispersion for at least 5 minutes by manually adjusting the air pressure to 60 lbs.

6. Fit the Graco Spray Gun with Tip No. DLN-C1150 (0.011 inch).

7. Assemble the Nerco-Niro Laboratory Spray Drier completely with the exception of the air driven atomizing turbine and establish the following temperature equilibrium:

Inlet Air: 115°–120° C.
Outlet Air: 45°–50° C.

8. Remove the porthole from the side of the spray drier, insert the spray gun and activate the gun maintaining constant spraying.

9. Occasionally inspect the gun for clogging, remove and clean tip if necessary.

10. Collect the product and dry in the vacuum oven at room temperature overnight. The Methylene Chloride residue is less than 0.5 percent.

11. The free flowing coated Sodium Dicloxacillin product is passed through a 40 mesh screen and collected.

EXAMPLE 8

Spray coated sodium dicloxacillin for oral suspension, 62.5 mg./5 ml. (ethylcellulose-castorwax-aratex-sesame oil-hydrogenated peanut oil coating

| Formula: | Per 60 ml. (grams) |
|---|---|
| Sodium dicloxacillin (spray coated ethylcellulose-castorwax-aratex-sesame oil-hydrogenated peanut oil from Example 7) | *0.825 |
| Sodium cyclamate | 2.400 |
| Sodium saccharin | 0.400 |
| Sodium citrate, anhydrous | 0.420 |
| Sodium benzoate | 0.060 |
| Sodium chloride | 1.200 |
| Gum tragacanth | 0.425 |
| Kaolin | 6.000 |
| Sucrose, 30 mesh | 25.000 |
| Dye | 0.500 |
| Flavors | 0.930 |

*Dicloxacillin activity, 3.7 g. This figure represents dicloxacillin activity and includes a 10% excess. To calculate the amount of sodium dicloxacillin to be used, apply the following formula:

$$\frac{0.825 \times 1{,}000}{\text{Potency of coated sodium dicloxacillin in mcg./mg.}} = \text{Grams coated sodium dicloxacillin to use per bottle.}$$

Manufacturing Instructions

1. Mix all of the ingredients except the spray coated Sodium Dicloxacillin and the Kaolin with approximately one-third of the sucrose in a suitable blender. Mix for 30 minutes. 2. Add the blend from step No. 1 to the remainder of the Sucrose and add the Kaolin. Mix for 30 minutes 3. Add the spray coated Sodium Dicloxacillin to the blend in step No. 2 and mix for 30 minutes.

4. Fill into 3 oz. round flint bottles.

Reconstitution: Add a sufficient volume of distilled water to make 60.0 ml. This will yield a suspension having 10 percent over the label claim potency of 62.5 mg. per 5 ml. of Sodium Dicloxacillin activity.

EXAMPLE 9

Spray coated ethylcellulose-spermaceti-castorwax-sodium dicloxacillin formula

| | Amount for 1,000 grams |
|---|---|
| Sodium dicloxacillin, micronized, grams | 250.0 |
| Ethylcellulose (viscosity 100 cps.), grams | 250.0 |
| Spermaceti wax, grams | 333.0 |
| Castorwax (melting point 85° C.), grams | 167.0 |
| Methylene chloride, liters | 15.0 |

NOTE.—This preparation must be prepared and kept at a temperature of 20°–25° C. in order to maintain solubility of the castorwax. Lower temperatures will inevitably lead to wax precipitation. The use of steam is recommended as a source of heat.

Manufacturing Instructions

1. Dissolve the Spermaceti Wax and Castorwax in 15 liters of Methylene Chloride. The operation is carried out in a stainless steel container with the aid of a mixer, (e.g. a Lightnin mixer). Maintain the temperature at about 20°–25° C. with the aid of steam if necessary.

2. To the clear solution obtained in step No. 1, add the Ethylcellulose in small portions while maintaining agitation. Stir until a clear and relatively viscous solution is obtained.

3. The Sodium Dicloxacillin is then added in small portions while maintaining agitation. A milky white suspension will result. The dispersion must be free from small lumps or agglomerates.

4. Strain the solution obtained in step No. 3 through three layers of cheesecloth if necessary to remove any particulate contaminants.

5. The Nerco-Niro Laboratory Model Spray Drier is readied as follows for the following conditions:

NOTE: Assemble completely before starting except for the atomizer.

a. Turn on the electric heater to setting No. 2 or 3 until the inlet air gauge reads around 130° C.

b. When equilibrium is reached. The inlet air gauge will read—115°–120° C. The outlet air gauge will read—50°–55° C.

c. Install the turbine atomizer in its proper position over a teflon gasket and feed compressed air until the atomizer gauge reads 6 kg./cm.$^2$. At this point maximum compressed air pressure is in use (90–100 lbs.) and the turbine is turning at a rate of 40,000 r.p.m. Allow 5 minutes for equilibrium in the chamber before liquid feeding is commenced.

d. Start liquid feed to the turbine from a 2-liter separatory funnel connected to the turbine by a short piece of teflon tubing. Feed at a rate of 60 to 80 ml. per minute e. Monitor the operation to maintain the following drying conditions throughout the entire operation:
Inlet Air: 115°–120° C.
Outlet Air: 60°–70° C.

f. Stop the atomizer and turn the electric heater to position M (exhaust fan) allow 5 minutes in this position before lifting cover.

g. Lift cover with the aid of the hydraulic lift and collect product from the walls. The product is not expected to stick to the walls of the chamber other than by electrostatic forces.

h. Dry product in vacuum oven overnight at room temperature. The Methylene Chloride residue is less than 0.5 percent.

i. The free flowing coated Sodium Dicloxacillin product is passed through a 40 mesh screen and collected.

EXAMPLE 10

Spray Coated Sodium Dicloxacillin for Oral Suspension, 62.5 mg/5 ml. (ethylcellulose-spermaceti-castorwax coating)

| Formula: | Per 60 ml. |
|---|---|
| Sodium dicloxacillin (spray coated ethylcellulose-spermaceti castorwax from Example 9), gram | 0.825 |
| Sodium cyclamate, grams | 2.400 |
| Sodium saccharin, gram | 0.400 |
| Sodium citrate, anhydrous, gram | 0.420 |
| Sodium benzoate, gram | 0.060 |
| Sodium chloride, grams | 1.200 |
| Gum tragacanth, gram | 0.425 |
| Kaolin, grams | 6.000 |
| Sucrose, 30 mesh, grams | 25.000 |
| Dye, gram | 0.500 |
| Flavors, gram | 0.930 |

*Dicloxacillin activity, 3.7 g. This figure represents dicloxacillin activity and includes a 10% excess. To calculate the amount of sodium dicloxacillin to be used, apply the following formula:

$$\frac{0.825 \times 1{,}000}{\text{Potency of coated sodium dicloxacillin in mcg./mg.}} = \text{Grams coated sodium dicloxacillin to use per bottle.}$$

Manufacturing Instructions

1. Mix all of the ingredients except the spray coated Sodium Dicloxacillin and the Kaolin with approximately one-third of the Sucrose in a suitable blender. Mix for 30 minutes.
2. Add the blend from step No. 1 to the remainder of the Sucrose and add the Kaolin. Mix for 30 minutes.
3. Add the spray coated Sodium Dicloxacillin to the blend in step No. 2 and mix for 30 minutes.
4. Fill into 3 oz. round flint bottles.

Reconstitution: Add a sufficient volume of distilled water to make 60.0 ml. This will yield a suspension having 10 percent over the label claim potency of 62.5 mg. per 5 ml. of Sodium Dicloxacillin activity.

EXAMPLE 11

A comparison was made of the blood levels obtained by oral administration of suspensions containing coated dicloxacillin with the blood levels obtained by oral administration of like suspensions containing uncoated dicloxacillin. A crossover study was used to determine the blood levels of the penicillin in human subjects. The results of the study are recorded in tables I and II below:

TABLE I

| Suspension | Average blood level for 12 patients (mg./ml.), hours after administration | | | | |
|---|---|---|---|---|---|
| | ½ | 1 | 2 | 3 | 4 |
| Control | 2.42 | 3.33 | 2.15 | 1.05 | 0.46 |
| Example 2 | 3.72 | 3.04 | 2.82 | 1.57 | 0.82 |

TABLE II

| Suspension | Average blood level for 12 patients (mg./ml.), hours | | | | |
|---|---|---|---|---|---|
| | ½ | 1 | 2 | 3 | 4 |
| Control | 3.28 | 3.71 | 2.23 | 0.95 | 0.45 |
| Example 4 | 2.84 | 3.53 | 3.11 | 1.99 | 0.98 |
| Example 6 | 2.88 | 3.75 | 2.50 | 1.23 | 0.71 |
| Example 8 | 2.47 | 3.74 | 2.63 | 1.41 | 0.83 |

For purpose of comparison the control suspension was prepared according to the procedure of example 2, however uncoated dicloxacillin was used in place of coated dicloxacillin.

Five milliliters of each of the suspensions were administered orally to each of 12 subjects, and the blood levels attained thereby were measured after periods of one-half, 1, 2, 3, and 4 hours after administration.

It is obvious by inspection of the tables that the suspensions employing coated dicloxacillin gave blood levels comparable to those attained with the suspensions employing uncoated dicloxacillin.

EXAMPLE 12

According to the procedure of example 2, eight oral suspensions are prepared in which dicloxacillin is replaced on an activity per 5 ml. basis, with 62.5 mg. ampicillin, 62.5 mg. hetacillin, 62.5 mg. cloxacillin, 62.5 mg. flucloxacillin, 62.5 mg. nafcillin, a mixture containing 125 mg. of ampicillin and 62.5 mg. of dicloxacillin, a mixture containing 125 mg. of hetacillin and 62.5 of dicloxacillin, a mixture containing 125 mg. of ampicillin and 62.5 mg. of cloxacillin, and a mixture containing 125 mg. of hetacillin and 62.5 mg. of cloxacillin, respectively, which have been previously coated as described in example 1 above.

EXAMPLE 13

Spray Coated Ethylcellulose—Spermaceti—Castor wax—Ampicillin Trihydrate

| Formula | Amounts for 1 1000 Grams |
|---|---|
| Ampicillin Trihydrate, micronized | 900.0 Grams |
| Ethylcellulose (viscosity 100 cps.) | 33.3 Grams |
| Spermaceti wax | 44.5 Grams |
| Castor wax (melting point 85° C.) | 22.2 Grams |
| Methylene Chloride | 9.0 Liters |

Manufacturing Instructions

Dissolve the Ethylcellulose, Spermaceti wax and Castor wax in 9.0 liters of Methylene Chloride at room temperature. Then add and disperse the micronized Ampicillin Trihydrate. Mix until uniform and strain through three layers of cheesecloth to remove any particulate contaminants. Spray dry (apparatus and method described in example 9) using air inlet temperature of 125°–135° C. and outlet temperature of 50°–70° C. The product coated Ampicillin Trihydrate is spread on trays and dried overnight at room temperature and then passed through a 40 mesh screen and collected.

EXAMPLE 14

Spray coated ampicillin trihydrate for oral suspension 125 mg./(ethylcellulose-spermaceti-castorwax coating)

| | Per 60 ml. | | |
|---|---|---|---|
| Formula | A | B | C |
| Ampicillin trihydrate (spray coated ethylcellulose-spermaceti-castorwax from Example 13), grams | 1.575* (Ampicillin trihydrate activity) 2.07 | 2.07 | 2.07 |
| Sucrose, grams | 28.0 | 28.0 | 25.0 |
| Sodium cyclamate, grams | 2.10 | 2.10 | 2.2 |
| Sodium benzoate, gram | 0.06 | .06 | 0.06 |
| Colloidal magnesium alluminum silicate (Veegum F, Vanderbilt Company Inc.), grams | 6.0 | 7.0 | 8.0 |
| Citric acid anhydrous, gram | 0.20 | 0.23 | 0.263 |
| Dye, grams | 1.50 | 1.50 | 1.50 |
| Flavors, grams | 0.94 | 1.53 | 1.53 |
| Reconstitution water volume, ml | 34 | 33 | 34 |

*This figure represents Ampicillin trihydrate activity and includes a 5% excess. To calculate the amount of Ampicillin trihydrate to be used, apply the following formula:

$$\frac{1.575 \times 1{,}000}{\text{Potency of coated ampicillin trihydrate in mcg./mg.}} = \text{Grams coated ampicillin trihydrate to use per bottle.}$$

Manufacturing Instructions

1. Mix all of the ingredients except the spray coated Ampicillin Trihydrate and the Colloidal Magnesium Aluminum Silicate with approximately one-third of the Sucrose in a suitable blender. Mix for 30 minutes.
2. Add the blend from step No. 1 to the remainder of the Sucrose and add the Colloidal Magnesium Aluminum Silicate. Mix for 30 minutes.
3. Add the spray coated Ampicillin Trihydrate to the blend in step No. 2 and mix for 30 minutes.
4. Fill into 3 oz. round flint bottles.

Reconstitution: Add a sufficient volume of distilled water to make 60.0 ml. This will yield a suspension having 5 percent over the label claim potency of 125 mg. per 5 ml. of Ampicillin activity.

EXAMPLE 15

According to the procedure of example 14 an oral suspension is prepared in which ampicillin trihydrate is replaced, on an activity per 5 ml. basis, with 125 mg. of anhydrous ampicillin which has been previously coated as described in example 13.

We claim:

1. An aqueous penicillin suspension for oral administration comprising an aqueous pharmaceutical vehicle, coated particles of a penicillin selected from the group consisting of ampicillin, hetacillin, nafcillin, oxacillin, cloxacillin, dicloxacillin and flucloxacillin and mixtures thereof, wherein said coated particles have a maximum particle size of about 40 mesh, a density of less than the density of the pharmaceutical vehicle and comprise from about 9 parts by weight of penicillin per part by weight of coating to about 7 parts by weight of coating per part by weight of penicillin and said coating comprises ethylcellulose and from about 1 to about 3 parts by weight of spermaceti wax per part by weight of ethylcellulose; and an effective amount of a member selected from the group consisting of kaolin and colloidal magnesium aluminum silicate to inhibit flotation of the coated penicillin particles in the pharmaceutical vehicle.

2. The aqueous penicillin suspension of claim 1 having from about 50 to about 125 mg. of penicillin activity per 5 ml. of suspension.

3. The aqueous penicillin suspension of claim 1 having from about 60 to about 70 mg. of penicillin activity per 5 ml. of suspension.

4. The aqueous penicillin suspension of claim 1 wherein said coating comprises about 1.7 parts by weight of spermaceti wax and 0.3 parts by weight of hydrogenated castor oil per part by weight of ethylcellulose.

5. The aqueous penicillin suspension of claim 1 wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to 33 g. of sucrose, and sufficient water to fill.

6. The aqueous penicillin suspension of claim 1 containing from about 1 to about 3 parts by weight of kaolin or from about 2 to 5 parts by weight of colloidal magnesium aluminum silicate per part by weight of coated penicillin particles.

7. The aqueous penicillin suspension of claim 1 having from about 50 to about 125 mg. of penicillin activity per 5 ml. of suspension and containing from about 1 to about 3 parts by weight of kaolin or from about 2 to 5 parts by weight of colloidal magnesium aluminum silicate per part by weight of coated penicillin.

8. The aqueous penicillin suspension of claim 5 having from about 50 to about 125 mg. of penicillin activity per 5 ml. of suspension and containing from about 3 to about 7 grams of kaolin or from about 6 to about 8 grams of colloidal magnesium aluminum silicate per 60 ml. of suspension.

9. The aqueous penicillin suspension of claim 1 having from about 50 to about 125 mg. of penicillin activity per 5 ml. of suspension and containng from about 3 to about 7 grams of kaolin or from about 6 to about 8 grams of colloidal magnesium aluminum silicate per 60 ml. of suspension.

10. The aqueous penicillin suspension of claim 9 wherein said coating comprises about 1.7 parts by weight of spermaceti wax and 0.3 parts by weight of hydrogenated castor oil per part by weight of ethylcellulose.

11. The aqueous penicillin suspension of claim 8 wherein said penicillin is dicloxacillin.

12. The aqueous penicillin suspension of claim 9 wherein said penicillin is dicloxacillin.

13. The aqueous penicillin suspension of claim 10 wherein said penicillin is dicloxacillin.

14. The aqueous penicillin suspension of claim 9 wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill.

15. The aqueous penicillin suspension of claim 14 wherein said coating comprises about 1.7 parts by weight of spermaceti wax and 0.3 parts by weight of hydrogenated castor oil per part by weight of ethylcellulose.

16. The aqueous penicillin suspension of claim 14 wherein said penicillin is dicloxacillin.

17. The aqueous penicillin suspension of claim 15 wherein said penicillin is dicloxacillin.

18. The aqueous suspension of claim 1 having from about 60 to about 70 mg. of penicillin activity per 5 ml. of suspension, wherein said penicillin is dicloxacillin and said coated particles comprise about 3 parts by weight of coating per part by weight of dicloxacillin and said coating comprises about 2 parts by weight of spermaceti wax per part by weight of ethylcellulose; wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 3 to about 7 g. of kaolin.

19. The aqueous suspension of claim 1 having from about 60 to about 70 mg. of penicillin activity per 5 ml. of suspension, wherein said penicillin is dicloxacillin and said coated particles comprise about 3 parts by weight of coating per part by weight of dicloxacillin and said coating comprises about 1.7 parts by weight of spermaceti wax and 0.3 parts by weight of hydrogenated castor oil per part by weight of ethylcellulose; wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 3 to about 7 g. of kaolin.

20. The aqueous suspension of claim 1 having from about 60 to about 70 mg. of penicillin activity per 5 ml. of suspension, wherein said penicillin is dicloxacillin and said coated particles comprise about 3 parts by weight of coating per part by weight of dicloxacillin and said coating comprises about 2 parts by weight of spermaceti wax per part by weight of ethylcellulose; wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 6 to about 8 g. of colloidal magnesium aluminum silicate.

21. The aqueous suspension of claim 1 having from about 60 to about 70 mg. of penicillin activity per 5 ml. of suspension, wherein said penicillin is dicloxacillin and said coated particles comprise about 3 parts by weigh of coating per part by weight of dicloxacillin and said coating comprises about 1.7 parts by weight of spermaceti wax and 0.3 parts by weight of hydrogenated castor oil per part by weight of ethylcellulose; wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 6 to about 8 g. of colloidal magnesium aluminum silicate.

22. The aqueous suspension of claim 1 having about 125 mg. of penicillin activity per 5 ml. of suspension, wherein said penicillin is ampicillin and said coated particles comprise about 9 parts by weight of ampicillin per part by weight of coating and said coating comprises about 2 parts by weight of spermaceti wax per part by weight of ethylcellulose; wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 3 to about 7 g. of kaolin.

23. The aqueous suspension of claim 1 having about 125 mg. of penicillin activity per 5 ml. of suspension, wherein said penicillin is ampicillin and said coated particles comprise about 9 parts by weight of ampicillin per part by weight of coating and said coating comprises about 2 parts by weight of spermaceti wax per part by weight of ethylcellulose; wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 6 to about 8 g. of colloidal magnesium aluminum silicate.

24. The aqueous suspension of claim 1 having about 125 mg. of penicillin activity per 5 ml. of suspension, wherein said penicillin is ampicillin and said coated particles comprise about 9 parts by weight of ampicillin per part by weight of coating and said coating comprises about 1.3 parts by weight of spermaceti wax and 0.7 parts by weight of hydrogenated castor oil per part by weight of ethylcellulose wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 3 to about 7 g. of kaolin.

25. The aqueous suspension of claim 1 having about 125 mg. of penicillin activity per 5 ml. of suspension, wherein said penicillin is ampicillin and said coated particles comprise about 9 parts by weight of ampicillin per part by weight of coating and said coating comprises about 1.3. parts by weight of spermaceti wax and 0.7 parts by weight of hydrogenated castor oil per part by weight of ethylcellulose; wherein the aqueous pharmaceutical vehicle comprises on the basis of 60 ml. of suspension from about 0.25 to about 0.75 g. of gum tragacanth, from about 0.5 to about 2.4 g. of sodium chloride, from about 5 to about 33 g. of sucrose, and sufficient water to fill; and contains on the basis of 60 ml. of suspension from about 6 to about 8 g. of colloidal magnesium aluminum silicate.

* * * * *